US 6,704,746 B2

(12) United States Patent
Sokolov et al.

(10) Patent No.: US 6,704,746 B2
(45) Date of Patent: Mar. 9, 2004

(54) METHOD AND APPARATUS FOR LAZY INSTANTIATION OF OBJECTS IN A VIRTUAL MACHINE

(75) Inventors: Stepan Sokolov, Fremont, CA (US); David Wallman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 210 days.

(21) Appl. No.: 09/736,644

(22) Filed: Dec. 12, 2000

(65) Prior Publication Data

US 2002/0073097 A1 Jun. 13, 2002

(51) Int. Cl.[7] .............................................. G06F 17/30
(52) U.S. Cl. ..................................... 707/103 R; 707/10
(58) Field of Search ........................... 707/103 R, 103, 707/103 Y, 103 Z, 10; 717/116, 139, 147, 148, 162, 165

(56) References Cited

U.S. PATENT DOCUMENTS

| 5,481,718 A | | 1/1996 | Ryu et al. .................... 395/700 |
| 5,864,862 A | * | 1/1999 | Kriens et al. ................ 707/101 |
| 6,003,038 A | | 12/1999 | Chen .......................... 707/103 |

FOREIGN PATENT DOCUMENTS

| GB | 2345355 A | * | 7/2000 | ........... G06F/12/02 |
| WO | WO97/27537 | | 7/1997 | |

OTHER PUBLICATIONS

Yaseen et al., An Extensible Kernel Object Management System, Conference on Object Oriented Programming Systems Languages and Applications, 1991, pp. 247–263.*

Madany et al., Organizing and Typing Persistent Objects within an Object Oriented Framework, System Sciences, 1992. Proceedings of the Twenty–Fifth Hawaii International Conference, pp. 800–809, vol. 1.*

Doyon et al., Verifying Object Initialization in the Java Bytecode Language; Symposium on Applied Computing, Proceedings of the 2000 ACM symposium on Applied computing 2000, Mar. 2000, Como, Italy, pp. 821–830.*

Phillip Bishop and Nigel Warren, Java Tip 67: Lazy Instantiation: Balancing Performance and Resource Usage, Java-World web site, www.javaworld.com, Jan. 1, 1999.*

Wiebe de Jong, "Static Initializers and Lazy Instantiation," www.developer.com/java/other/article.php/626421, May 17, 2000.*

The GNU Compiler for the Java Programming Language (http://gcc.gnu.org/java).*

Phillip Bishop and Nigel Warren, Java Tip 67: Lazy Instantiation: Balancing Performance and Resource Usage, Java-World web site, www.javaworld.com, Jan. 1, 1999.*

Wiebe de Jong, "Static Initializers and Lazy Instantiation," www.developer.com/java/other/article.php/626421, May 17, 2000.*

* cited by examiner

Primary Examiner—Diane D. Mizrahi
(74) Attorney, Agent, or Firm—Park, Vaughan & Fleming LLP; Edward J. Grundler

(57) ABSTRACT

One embodiment of the present invention provides a system for creating objects in a virtual machine. The system operates by receiving a request to create an object within an object-oriented programming system. Upon receiving the request, if a meta-class instance associated with the object does not already exist, the system creates a structure to represent the meta-class instance in a data space that is not subject to garbage collection. If an explicit instruction to create the meta-class instance is detected, the system creates the meta-class instance within a garbage-collected data space.

23 Claims, 3 Drawing Sheets

METHOD AND APPARATUS FOR LAZY INSTANTIATION OF OBJECTS IN A VIRTUAL MACHINE

FIELD OF THE INVENTION

The present invention relates to objects defined within an object-oriented computer programming system. More specifically, the present invention relates to a method and apparatus for creating objects within an object-oriented computer programming system.

RELATED ART

The recent proliferation of ever smaller and more capable computing devices has lead to the use of platform-independent programming languages on these smaller devices. Platform-independent programming languages allow the creation of programs that can be compiled to a set of platform-independent codes, which can be executed on a variety of computing devices. Many of these computing devices have interpreters that execute these platform-independent codes. The JAVA™ programming language is an example of a platform-independent programming language and JAVA bytecodes are an example of platform-independent codes.

The terms JAVA, JVM and JAVA VIRTUAL MACHINE are registered trademarks of SUN Microsystems, Inc. of Palo Alto, Calif.

Many platform-independent programming languages, including JAVA, are object-oriented programming languages. An object is typically an instance of a class, which usually has data and methods associated with it. Note that methods are functions that are used to manipulate data.

These objects may also have a meta-class instance associated with them. For instance, the JAVA virtual machine (VM) creates a java.lang.Class instance for each class that is loaded by the VM. The meta-class instance is created in an area of memory called the heap and contains information common to all objects of that class. Information within the meta-class instance includes, but is not limited to, the number of variables associated with each instance of the class and the number of methods associated with the class.

Some drawbacks to creating meta-class instances on the heap are that these objects can take up a large amount of space on the heap and that a program may create many of these objects. This can be a problem for smaller computing devices, which have limited storage space within the heap that can be quickly consumed by the meta-class instances. Also, with many meta-class instances stored within the heap, garbage collection takes more of the computing devices resources, thereby slowing the overall execution of the program.

Under many circumstances, creation of the meta-class instance is not required. As an example, the JAVA specification requires the creation of a meta-class instance only when the java.lang.Object::getClass() method is explicitly invoked. Hence, creating the meta-class instance wastes resources under many circumstances.

What is needed is a method and apparatus for eliminating this waste of resources while maintaining the integrity of the platform-independent programming system.

SUMMARY

One embodiment of the present invention provides a system for creating objects in a virtual machine. The system operates by receiving a request to create an object within an object-oriented programming system. Upon receiving the request, if a meta-class instance associated with the object does not already exist, the system creates a structure to represent the meta-class instance in a data space that is not subject to garbage collection. If an explicit instruction to create the meta-class instance is detected, the system creates the meta-class instance within a garbage-collected data space.

In one embodiment of the present invention, the structure is created by directly executing instructions in a native language of a computing device, without having to convert platform-independent instructions into instructions in the native language of the computing device.

In one embodiment of the present invention, the system initializes a variable within the structure with a value. After initializing the variable with a value, the system can change the value of the variable. The system can also invoke an executable method of the object. In this embodiment, the acts of initializing a variable, changing the value of the variable, and invoking an executable method of the object involve executing the native language of the computing device.

In one embodiment of the present invention, the system destroys the structure using the native language of the computing device when the object is no longer needed.

In one embodiment of the present invention, the meta-class instance is created by executing instructions within an interpreted language.

In one embodiment of the present invention, the system initializes a variable within the meta-class instance with a value. After initializing the variable with a value, the system can change the value of the variable. The system can also invoke an executable method of the meta-class instance. In this embodiment, the acts of initializing a variable, changing the value of the variable, and invoking an executable method of the object include converting platform-independent instructions into native language instructions of a computing device.

In one embodiment of the present invention, the system allows the meta-class instance to be deleted by a garbage collector when the meta-class instance is no longer needed.

In one embodiment of the present invention, the meta-class instance includes a java.lang.Class instance.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Device

Figure 1:
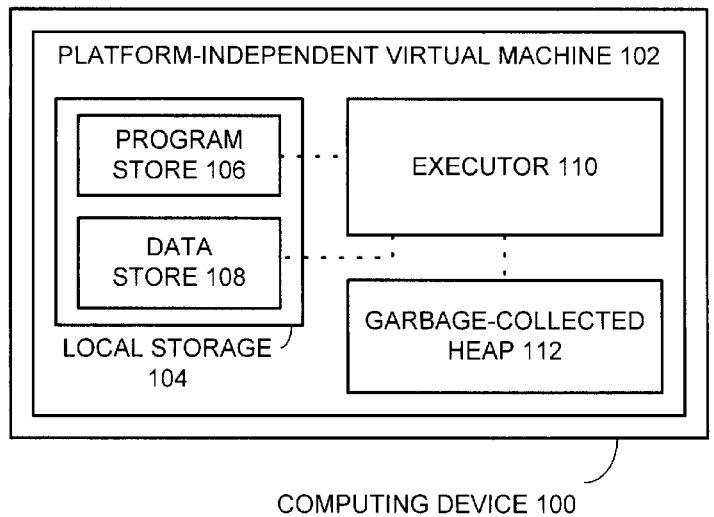
FIG. 1 illustrates computing device 100 in accordance with an embodiment of the present invention.

FIG. 1 illustrates computing device 100 in accordance with an embodiment of the present invention. Computing device 100 may include any type of computer system, including, but not limited to, a computer system based on a microprocessor, a mainframe computer, a digital signal processor, a personal organizer, a device controller, and a computational engine within an appliance.

Included within computing device 100 is platform-independent virtual machine 102. In one embodiment of the present invention, platform-independent virtual machine 102 is a JAVA VIRTUAL MACHINE. Platform-independent virtual machine 102 includes local storage 104, executor 110 and garbage-collected heap 112.

Local storage 104 can include any type of storage that can be coupled to a computer system. This includes, but is not limited to, semiconductor random access memory, read-only memory, magnetic, optical, and magneto-optical storage devices, as well as storage devices based on flash memory and/or battery-backed up memory. Local storage 104 includes program store 106 and data store 108. Program store 106 stores and provides the instructions that executor 110 uses to perform operations directed by a program. Data store 108 stores data structures for executor 110. Note that these data structures serve as surrogate meta-class instances for objects within an object-oriented programming system.

Executor 110 performs operations within platform-independent virtual machine 102 as directed by the program code stored in program store 106. In one embodiment of the present invention, executor 110 is implemented as an interpreter, which interprets the platform-independent code within program store 106.

In addition to storing objects defined within an object-oriented programming system, garbage-collected heap 112 stores meta-class instances for these objects. Note that these meta-class instances stored within garbage-collected heap 112 are subject to garbage-collection.

Platform-Independent Virtual Machine

Figure 2:
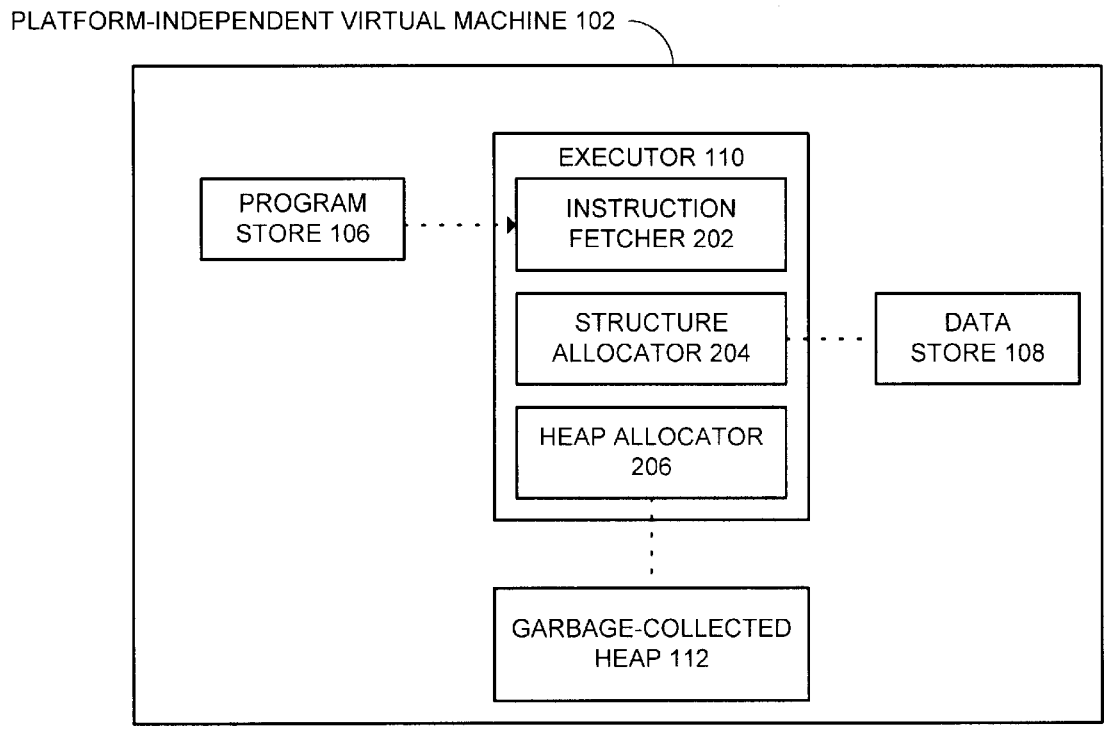
FIG. 2 illustrates platform-independent virtual machine 102 in accordance with an embodiment of the present invention.

FIG. 2 illustrates platform-independent virtual machine 102 in accordance with an embodiment of the present invention. As described above, platform-independent virtual machine 102 includes executor 110. Executor 110 includes instruction fetcher 202, structure allocator 204, and heap allocator 206.

Instruction fetcher 202 fetches instructions from program store 106 for execution by executor 110. When executor 110 is implemented as an interpreter, executor 110 determines which of its internal, native-code instructions correspond with the fetched instruction from program store 106. If the instruction is an instruction to create a new object, executor 110 uses structure allocator 204 to allocate a structure within data store 108 as a surrogate meta-class instance for an object within an object-oriented programming system.

If the instruction is an explicit request to create the meta-class instance, for instance a JAVA call instruction to the object's getClass() method, executor 110 uses heap allocator 206 to create the meta-class instance within garbage-collected heap 112.

Creating Structures and Meta-Class Instances

Figure 3:
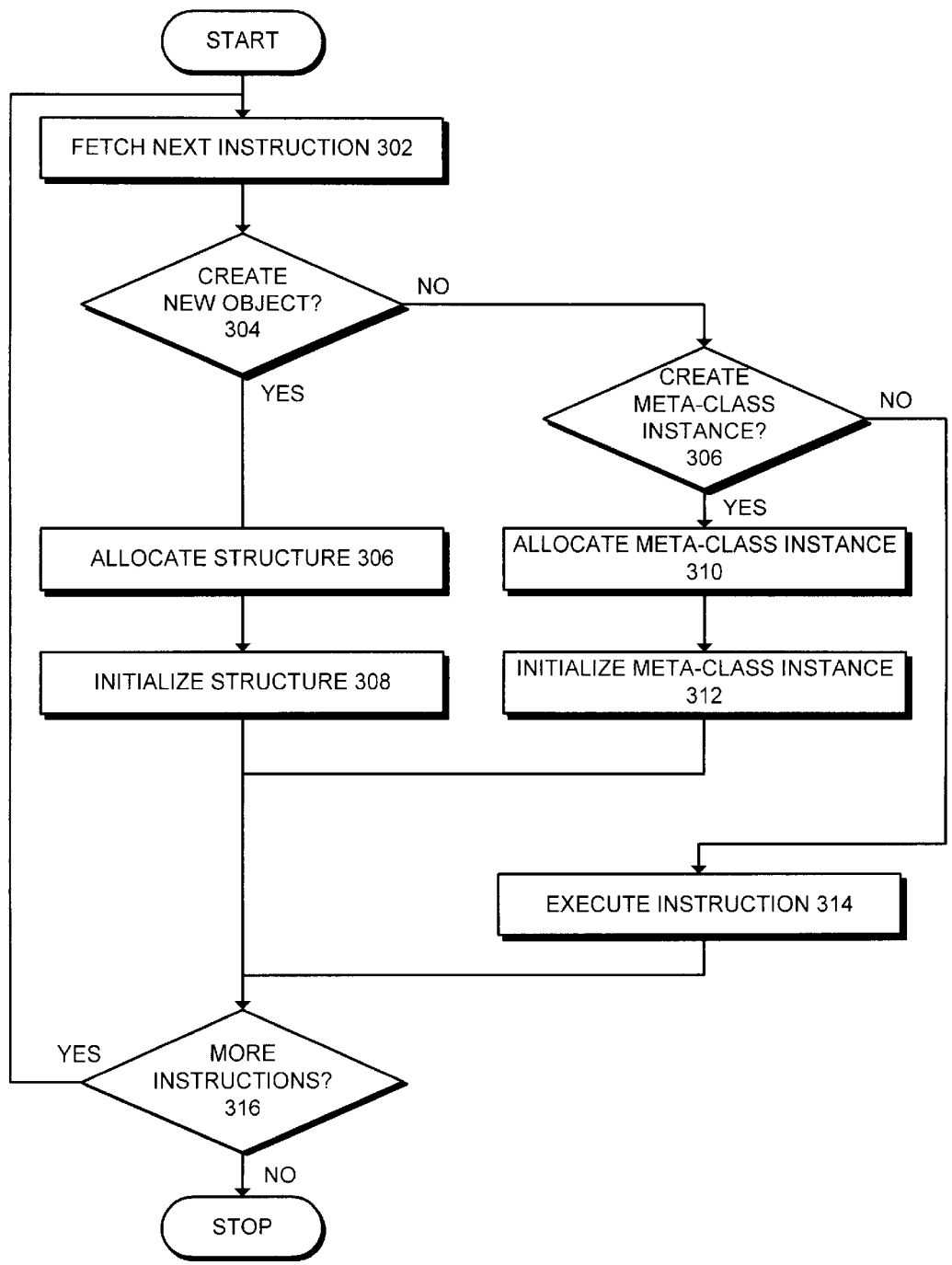
FIG. 3 is a flowchart illustrating the process of fetching instructions and creating a structure or a meta-class instance in accordance with an embodiment of the present invention.

FIG. 3 is a flowchart illustrating the process of fetching instructions and creating a structure or a meta-class instance in accordance with an embodiment of the present invention. The system starts when instruction fetcher 202 fetches the next instruction from program store 106 (step 302). Executor 110 then determines if the instruction is an instruction to create a new object (step 304).

If the instruction is an instruction to create a new object at step 304, structure allocator 204 creates a structure in data store 108 to serve as a surrogate meta-class instance (step 306). Executor 110 then initializes the structure within data store 108 (step 308). Note that since the structure is a surrogate meta-class instance, the structure is a substitute for the meta-class instance and includes variables, which can be initialized and changed by executing the native language of computing device 100, and executable methods, which can be invoked by executing the native language of computing device 100.

If the instruction is not an instruction to create a new object at step 304, executor 110 determines if the instruction is an explicit instruction to create a meta-class instance (step 306).

If the instruction is an explicit instruction to create a meta-class instance at step 306, heap allocator 206 creates a new meta-class instance in garbage-collected heap 112 (step 310). Next, executor 110 initializes the meta-class instance (step 312).

If the instruction is not an explicit instruction to create a meta-class instance at step 306, executor 110 executes the instruction (step 314).

After initializing the structure at step 308, initializing the meta-class instance at step 312, or executing the instruction at step 314, executor 110 determines if there are more instructions to execute within program store 106 (step 316).

If there are more instructions within program store 106 at step 316, executor 110 returns to step 302 to continue executing instructions. If there are no more instructions at step 316, the program terminates.

Deleting Structures and Meta-Class Instances

Figure 4:
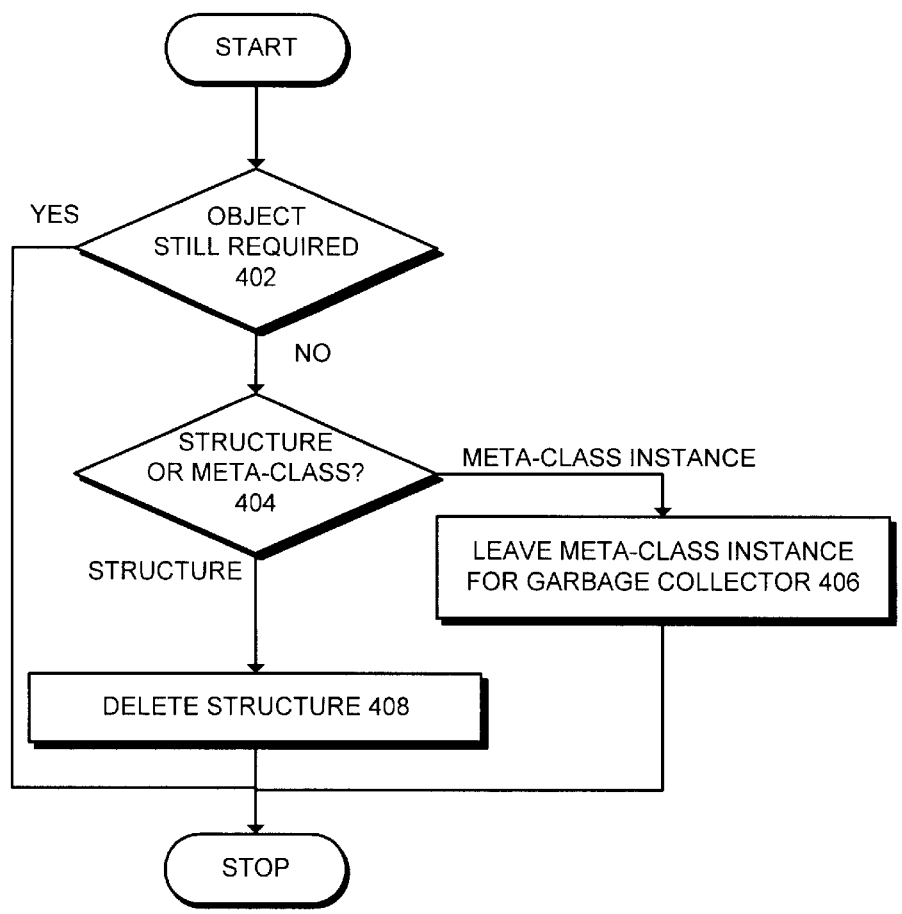
FIG. 4 is a flowchart illustrating the process of deleting a structure or a meta-class instance in accordance with an embodiment of the present invention.

FIG. 4 is a flowchart illustrating the process of deleting a structure or a meta-class instance in accordance with an embodiment of the present invention. The system starts when executor 110 determines if an object is still required (step 402).

If the object is not still required, executor 110 determines if the object is a structure or a meta-class instance (step 404). If the object is a structure, executor 110 deletes the structure from data store 108 (step 408).

If the object is a meta-class instance within garbage-collected heap 112, executor 110 deletes the reference to the meta-class instance and leaves the object for the garbage collector to delete (step 406).

If the object is still required at step 402, after the structure is deleted at step 408, or after leaving the meta-class instance to be deleted by the garbage collector at step 406, the process terminates.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for creating objects in a virtual machine, comprising;
   receiving a request to create an object within an object-oriented programming system;
   creating a surrogate meta-class instance associated with the object if the meta-class instance does not already exist, wherein the surrogate meta-class instance is created outside of the system heap in a data space that is not subject to garbage collection; and
   upon detecting an explicit instruction to create the meta-class instance, creating the meta-class instance within the system heap;
   whereby system heap space is not unnecessarily consumed by the meta-class instance unless an explicit instruction to create the meta-class instance in the system heap is received.

2. The method of claim 1, wherein the meta-class instance is created using an interpreted language.

3. The method of claim 2, further comprising;
   initializing a variable within the meta-class instance with a value;
   changing the value of the variable; and
   invoking an executable method of the meta-class instance;
   wherein the acts of initializing, changing, and invoking include converting platform-independent instructions into native language instructions of a computing device.

4. The method of claim 2, further comprising allowing the meta-class instance to be deleted by a garbage collector when the meta-class instance is no longer needed.

5. The method of claim 1, wherein the meta-class instance includes a java-lang.Class instance.

6. The method of claim 1, wherein the surrogate meta-class instance is created by directly executing instructions in a native language of a computing device, without having to convert platform-independent instructions into instructions in the native language of the computing device.

7. The method of claim 6, further comprising;
   initializing a variable within the surrogate meta-class instance with a value;
   changing the value of the variable; and
   invoking an executable method of the object;
   wherein the acts of initializing, changing, and invoking involve executing the native language of the computing device.

8. The method of claim 6, further comprising destroying the surrogate meta-class instance using the native language of the computing device when the object is no longer needed.

9. A computer-readable storage medium storing instructions that when executed by a computer cause the computer to perform a method for creating objects in a virtual machine, the method comprising;
   receiving a request to create an object within an object-oriented programming system;
   creating a surrogate meta-class instance associated with the object if the meta-class instance does not already exist, wherein the surrogate meta-class instance is created outside of the system heap in a data space that is not subject to garbage collection; and
   upon detecting an explicit instruction to create the meta-class instance, creating the meta-class instance within the system heap;
   whereby system heap space is not unnecessarily consumed by the meta-class instance unless an explicit instruction to create the meta-class instance in the system heap is received.

10. The computer-readable storage medium of claim 9, wherein the meta-class instance is created using an interpreted language.

11. The computer-readable storage medium of claim 10, the method further comprising;
    initializing a variable within the meta-class instance with a value;
    changing the value of the variable; and
    invoking an executable method of the meta-class instance;
    wherein the acts of initializing, changing, and invoking include converting platform-independent instructions into native language instructions of a computing device.

12. The computer-readable storage medium of claim 10, the method further comprising allowing the meta-class instance to be deleted by a garbage collector when the meta-class instance is no longer needed.

13. The computer-readable storage medium of claim 9, wherein the meta-class instance includes a java.lang.Class instance.

14. The computer-readable storage medium of claim 9, wherein the surrogate meta-class instance is created by directly executing instructions in a native language of a computing device, without having to convert platform-independent instructions into instructions in the native language of the computing device.

15. The computer-readable storage medium of claim 14, the method further comprising;
    initializing a variable within the surrogate meta-class instance with a value;
    changing the value of the variable; and
    invoking an executable method of the object;
    wherein the acts of initializing, changing, and invoking involve executing the native language of the computing device.

16. The computer-readable storage medium of claim 14, the method further comprising destroying the surrogate meta-class instance using the native language of the computing device when the object is no longer needed.

17. An apparatus that facilitates creating objects in a virtual machine, comprising;
    a receiving mechanism that is configured to receive a request to create an object within an object-oriented programming system;
    a creating mechanism that is configured to create a surrogate meta-class instance associated with the object if the meta-class instance does not already exist, wherein the surrogate meta-class instance is created outside of the system heap in a data space that is not subject to garbage collection; and wherein the creating mechanism is further configured to create the meta-class instance within the system heap upon detecting an explicit instruction to create the meta-class instance;

whereby system heap space is not unnecessarily consumed by the meta-class instance unless an explicit instruction to create the meta-class instance in the system heap is received.

18. The apparatus of claim 17, wherein the creation mechanism is configured to create the meta-class instance using an interpreted language.

19. The apparatus of claim 18, further comprising;

an initializing mechanism that is configured to initialize a variable within the meta-class instance with a value;

a changing mechanism that is configured to change the value of the variable; and an invoking mechanism that is configured to invoke an executable method of the meta-class instance;

wherein the initializing, changing, and invoking mechanisms are configured to convert platform-independent instructions into native language instructions of a computing device.

20. The apparatus of claim 17, wherein the meta-class instance includes a java.lang.Class instance.

21. The apparatus of claim 17, wherein the surrogate meta-class instance is created by directly executing instructions in a native language of a computing device, without having to convert platform-independent instructions into instructions in the native language of the computing device.

22. The apparatus of claim 21, further comprising;

an initializing mechanism that is configured to initialize a variable within the surrogate meta-class instance with a value;

a changing mechanism that is configured to change the value of the variable; and an invoking mechanism that is configured to invoke an executable method of the object;

wherein the initializing, changing, and invoking mechanisms execute the native language of the computing device.

23. The apparatus of claim 21, further comprising a destroying mechanism that is configured to destroy the surrogate meta-class instance using the native language of the computing device when the object is no longer needed.

* * * * *